US006895528B2

(12) United States Patent
Cantwell et al.

(10) Patent No.: US 6,895,528 B2
(45) Date of Patent: May 17, 2005

(54) METHOD AND APPARATUS FOR IMPARTING FAULT TOLERANCE IN A SWITCH OR THE LIKE

(75) Inventors: Larry J. Cantwell, Moorestown, NJ (US); Harry V. Paul, Haddonfield, NJ (US)

(73) Assignee: Computer Network Technology Corporation, Minneapolis, MN (US)

( * ) Notice: Subject to any disclaimer, the term of this patent is extended or adjusted under 35 U.S.C. 154(b) by 416 days.

(21) Appl. No.: 09/920,751

(22) Filed: Aug. 3, 2001

(65) Prior Publication Data

US 2002/0019958 A1 Feb. 14, 2002

Related U.S. Application Data

(60) Provisional application No. 60/223,522, filed on Aug. 7, 2000.

(51) Int. Cl.[7] .................................................. G06F 11/00
(52) U.S. Cl. ........................................ 714/12; 370/217
(58) Field of Search ................................ 714/12, 8, 27, 714/38, 43, 47, 56, 31, 13, 18; 370/217, 218, 220, 244, 248, 216

(56) References Cited

U.S. PATENT DOCUMENTS

| | | | | |
|---|---|---|---|---|
| 3,920,975 A | * | 11/1975 | Bass ........................... | 714/716 |
| 4,497,054 A | | 1/1985 | Read | |
| 5,361,249 A | | 11/1994 | Monastra et al. | |
| 5,455,917 A | | 10/1995 | Holeman et al. ............ | 395/287 |
| 5,796,717 A | | 8/1998 | Shinbashi et al. | |
| 5,805,614 A | | 9/1998 | Norris | |
| 5,844,887 A | | 12/1998 | Oren et al. .................. | 370/218 |
| 5,909,427 A | | 6/1999 | Manning et al. | |
| 5,959,987 A | * | 9/1999 | Humphrey et al. ......... | 370/352 |
| 5,983,260 A | | 11/1999 | Hauser et al. ............... | 709/201 |
| 5,999,527 A | | 12/1999 | Petersen ...................... | 370/360 |
| 6,035,414 A | | 3/2000 | Okazawa et al. | |
| 6,067,286 A | * | 5/2000 | Jones et al. .................. | 370/218 |
| 6,092,111 A | * | 7/2000 | Scivier et al. ............... | 709/227 |
| 6,246,681 B1 | * | 6/2001 | Humphrey et al. ......... | 370/389 |
| 6,411,599 B1 | * | 6/2002 | Blanc et al. ................. | 370/219 |
| 6,430,151 B1 | * | 8/2002 | Glas et al. ................... | 370/222 |
| 6,553,508 B1 | * | 4/2003 | Minyard ........................ | 714/4 |

FOREIGN PATENT DOCUMENTS

| | | |
|---|---|---|
| EP | 0 720 413 A2 | 3/1996 |
| EP | 0959591 | 5/1999 |
| EP | 1016980 | 12/1999 |

OTHER PUBLICATIONS

Rathgeb, E.P., "Redundancy Concepts for a Large ATM Switching Node" Iss '97, vol. 1, Sep. 21, 1997, pp. 425–433.
Fischer W., et al., "A Scalable ATM Switching System Architecture" IEEE Journal on Selected Areas in Communications, vol. 9, Oct. 1, 1991, pp. 1299–1307.

* cited by examiner

Primary Examiner—Naddem Iqbal
(74) Attorney, Agent, or Firm—Beck & Tysver P.L.L.C.

(57) ABSTRACT

A method and apparatus for imparting fault tolerance in a switch or the like, particularly in a fibre channel director switch employed in connection with storage area network.

25 Claims, 9 Drawing Sheets

METHOD AND APPARATUS FOR IMPARTING FAULT TOLERANCE IN A SWITCH OR THE LIKE

CROSS REFERENCE TO RELATED APPLICATIONS

The present application claims priority from U.S. Patent Application Ser. No. 60/223,522 filed Aug. 7, 2000, the content of which is incorporated herein by reference in its entirety, including the title, specification, claims, drawings and abstract.

BACKGROUND OF THE INVENTION

1. Field of the Invention

The present invention relates generally to channel director products and methods and in particular to a methodology and system for imparting fault tolerance.

2. Description of Related Art

Mainframes, super computers, mass storage systems, workstations and very high resolution display subsystems are frequently connected together to facilitate file and print sharing. Common networks and channels used for these types of connections oftentimes introduce communications bottle necking, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions.

One type of communications interconnect that has been developed is fibre channel. The fibre channel protocol was developed and adopted as the American National Standard for Information Systems (ANSI). See Fibre Channel Physical and Signaling Interface, Revision 4.3, American National Standard for Information Systems (ANSI) (1994) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of transmitting frames at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fibre and copper cable.

The fibre channel industry indicates that the information explosion and the need for high-performance communications for server-to-storage and server-to-server networking have been the focus of much attention during the 90s. Performance improvements in storage, processors, and workstations, along with the move to distributed architectures such as client/server, have spawned increasingly data-intensive and high-speed networking applications. The interconnect between these systems and their input/output devices demands a new level of performance in reliability, speed, and distance. Fibre channel, a highly-reliable, gigabit interconnect technology allows concurrent communications among workstations, mainframes, servers, data storage systems, and other peripherals using SCSI and IP protocols. It provides interconnect systems for multiple topologies that can scale to a total system bandwidth on the order of a terabit per second. Fibre channel delivers a new level of reliability and throughput. Switches, hubs, storage systems, storage devices, and adapters are among the products that are on the market today, providing the ability to implement a total system solution.

IT systems frequently support two or more interfaces, and sharing a port and media makes sense. This reduces hardware costs and the size of the system, since fewer parts are needed. Fibre channel, a family of ANSI standards, is a common, efficient transport system supporting multiple protocols or raw data using native fibre channel guaranteed delivery services. Profiles define interoperable standards for using fibre channel for different protocols or applications.

Fibre channel, a channel/network standard, contains network features that provide the required connectivity, distance, and protocol multiplexing. It also supports traditional channel features for simplicity, repeatable performance, and guaranteed delivery. Fibre channel also works as a generic transport mechanism.

Fibre channel architecture represents a true channel/network integration with an active, intelligent interconnection among devices. A fibre channel port provides management of a simple point-to-point connection. The transmission is isolated from the control protocol, so that point-to-point links, arbitrated loops, and switched topologies are used to meet the specific needs of an application. The fabric is self-managing. Nodes do not need station management, which greatly simplifies implementation.

FIG. 1 illustrates a variable-length frame 11 as described by the fibre channel standard. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

FIG. 2 illustrates a block diagram of a representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e., fibre channel switch). The fabric 110 is an entity that interconnects various node-ports (N-ports) 140 and their associated workstations, mainframes and peripherals attached to the fabric 110 through the F-ports 142. The essential function of the fabric 110 is to receive frames of data from a source N-port and, using a first protocol, route the frames to a destination N-port. In a preferred embodiment, the first protocol is the fibre channel protocol. Other protocols, such as the asynchronous transfer mode (ATM) could be used without departing from the scope of the present invention.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," or fibre channel switch to connect devices. The fabric includes a plurality of fabric-ports (F-ports) that provide for interconnection and frame transfer between a plurality of node-ports (N-ports) attached to associated devices that may include workstations, super computers and/or peripherals. The fabric has the capability of routing frames based upon information contained within the frames. The N-port manages the simple point-to-point connection between itself and the fabric. The type of N-port and associated device dictates the rate that the N-port transmits and receives data to and from the fabric. Transmission is isolated from the control protocol so that different topologies (e.g., point-to-point links, rings, multidrop buses, cross point switches) can be implemented.

The fibre channel industry standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer requires allocation of a path through the network switch for each transfer of a single frame from one network element to another.

With the widespread adoption and implementation of fibre channel equipment in many environments, the fault tolerance of such a system as a data center product has been identified as a very important goal. Indeed fault tolerance and non-disruptive module replacement as well as non-disruptive upgrades in terms of software, firmware and hardware are desirable, if not critical according to present industry demands.

SUMMARY OF THE INVENTION

In accordance with the present invention, there is provided a fault tolerant director switch comprising: at least two input/output boards, each having at least one port; at least two fabric switch boards for providing switched connections, one of which is adapted to function as a spare fabric switch board; and a redundant command and control interface for said switch comprising at least two control modules.

There is further provided a method for providing fault tolerance in a director switch comprising: providing Fibre Input/Output Interface ("FIO") modules that are connected through a backplane through at least one fabric switch board by backlink paths, wherein two backlink paths are provided from each FIO to each fabric switch board, and in the event of failure detected by the switch, redirecting any failed backlink path to a spare fabric switch board.

Additional objects, advantages and features of the present invention will be apparent from the following detailed description, claims and figures.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

The present invention relates generally to a Storage Area Network (SAN) director switch, and particularly a fibre channel director. An important function of the instant switch and corresponding methodology is to provide highly reliable connectivity between mainframe, workstation and PC based servers and their peripheral devices. As a director-class solution, a channel director according to the present invention is designed to employ a highly fault tolerant architecture. Reliability, availability, and serviceability (RAS) features that are generally considered important for deployment of a switch architecture in environments where the transport and storage of data must be done without error and in the most technologically efficient manner. In this regard, the present invention employs redundant switching, internal pathing, control modules, and power supplies and cooling as well as non-disruptive SW/FW upgrades that help businesses achieve up to the desired the "five nines" (99.999%) system uptime that is often equated with vital success in data center environments. A channel director according to the present invention is generally capable of enabling Fibre Channel switching across a variety of Fibre Channel media standards and provide the technology to support new standards as they are approved. The present invention also has the ability to utilize other applications that support the local channel conversion and wide area transport of Storage Area Networking. A common channel director environment includes multiple switches as well as other Fibre Channel directors deployed into these networks which are referred to as 'fabrics'.

Figure 1:
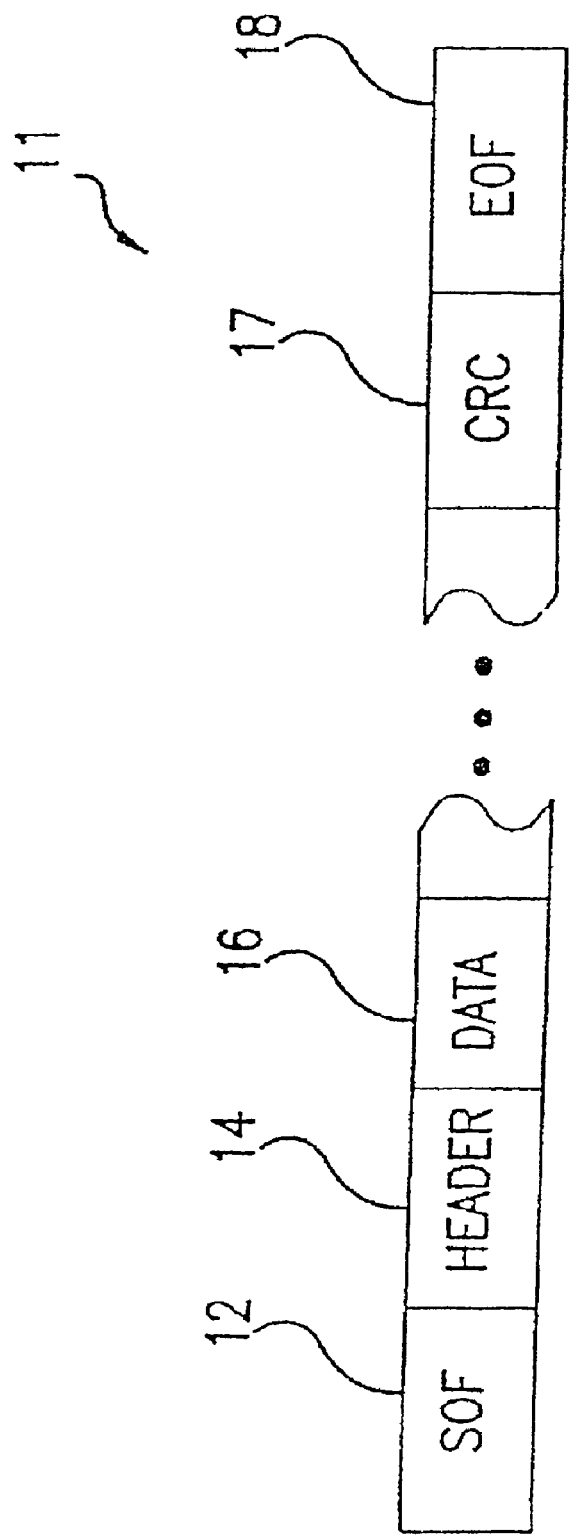
FIG. 1 illustrates a variable-length frame as described by the fibre channel standard.
Figure 2:
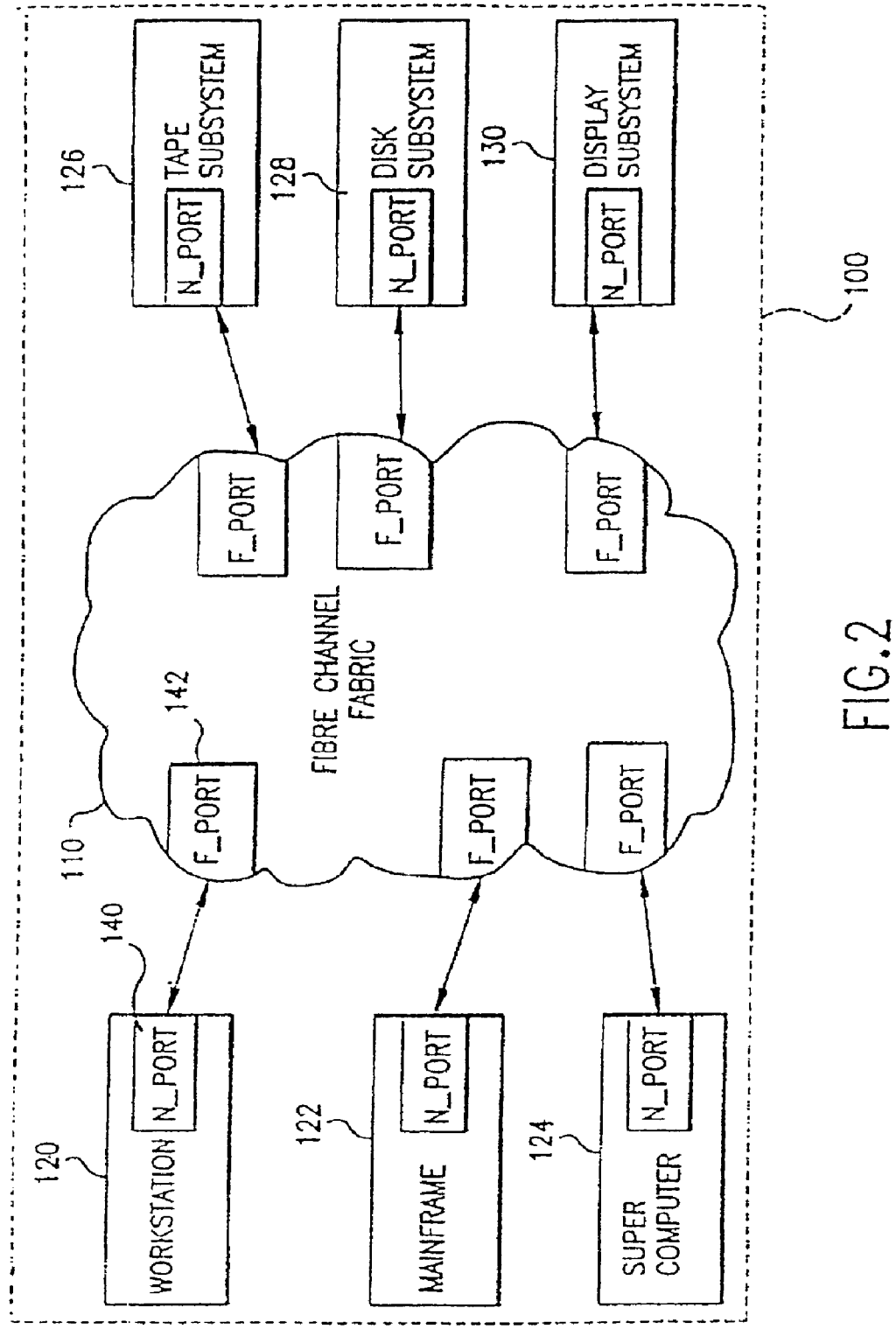
FIG. 2 illustrates a block diagram of a representative fibre channel architecture in a fibre channel network.
Figure 3:
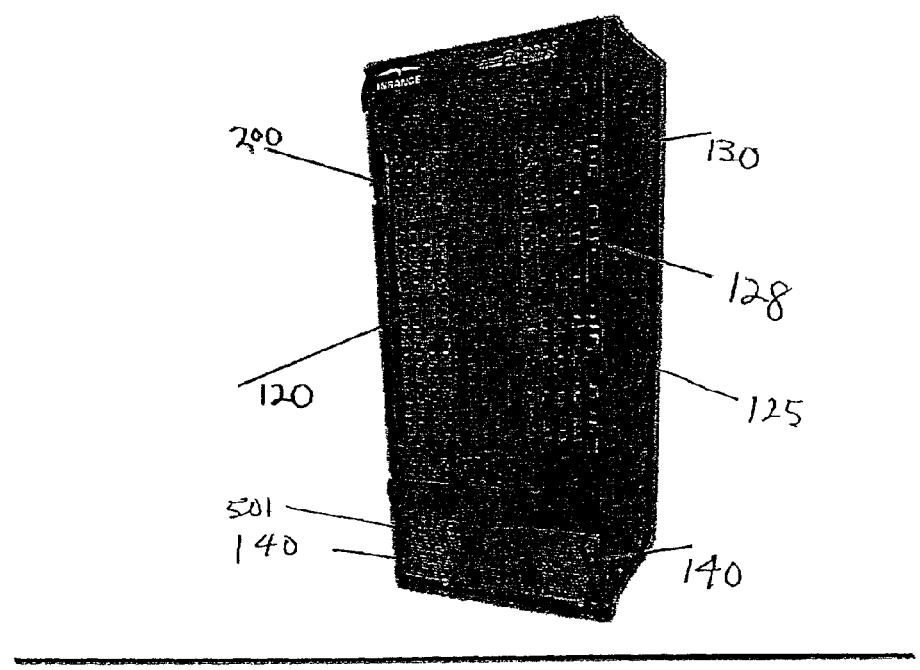
FIG. 3 illustrates a front view showing a presentative chassis incorporating certain aspects of the present invention.

See FIG. 3 that shows a suitable arrangement for a channel director chassis according to the present invention. As depicted in FIG. 3, there are FIO port cards, 200 that are redundantly connected to FSW spare cards 120 and backlink redirectors. The FSW switching cards 120 employ a middle card 125 that is a hot spare. Additionally, as shown in FIG. 3 there are preferably 2 redundant FCM controllers 128. There are suitably 4 interchangeable fans 130, a redundant power supply 140 and AC.

Figure 4:
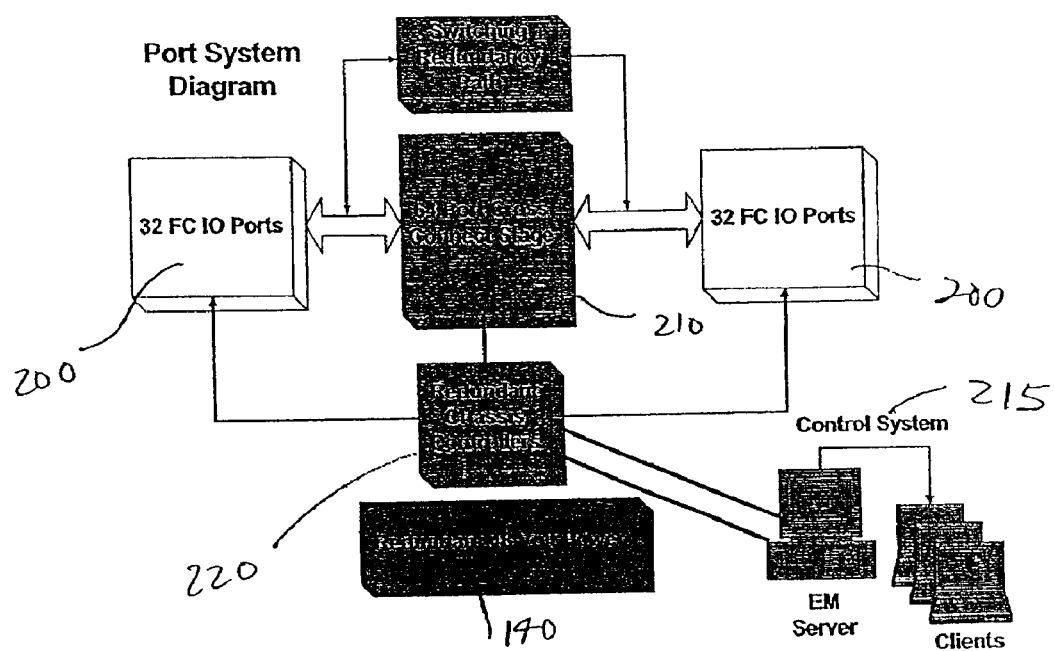
FIG. 4 illustrates a flow diagram outlining a global overview of redundant functionality of one aspect of the present invention.

FIG. 4 illustrates a system block diagram showing a suitable arrangement of a system and method according to the present invention. In one embodiment, there are preferably two sets of 32 Fibre Channel IO ports 200, and a 64 port cross connect stage 210 that provides a redundant switching path in both directions by virtue of redundant chassis controllers 220. The controllers receive input from any and all peripherals such as an EM Server and other clients shown as 215 in FIG. 4. Any power source can be employed but it is preferably redundant and can be, for example, a 48 Volt source 140. Key design attributes beyond the scalable switching architecture center around functions and features that make the present director a fault tolerant hardened Data Center product. It is typically deployed in environments that require continuous 24 hour×7 day high bandwidth Fibre Channel switching. A channel director according to the present invention is designed with fault tolerant features. It is an important feature of the present invention that the channel director and peripheral equipment described herein has no single point of failure by virtue of redundant functionality that is architected into the system.

Redundancy as it used herein is defined as duplication or repetition of functions in a switching system along with the proper control of these functions to provide alternative channels in case of failure. The operation of the redundant elements should be controlled in such a way that an element failure is transparent to system functional operation. In plain terms, this means that no failure of a single Field Replaceable Unit (FRU) within the system shall cause loss of critical customer data or noticeable interruption of system switching operation or performance. A FRU is a system component, board or module. The system is designed in a modular fashion with proper FRU granularity such that a single failure is tolerable within the confines of itself, as it does not affect the switching system function or its components as a whole.

A second element that is important to fault tolerance is the ability to detect system problems diagnostically at the lowest level of system components. A channel director of the present invention preferably has continuous internal diagnostic checking on all of its data and control paths. This includes cyclic redundancy checks, synchronization checks and data encoding checks, etc. throughout each stage of real data and control data transmission.

A third element of fault tolerance is the ability for the system to 'heal' itself upon detection of a fault condition. The present invention provides a mechanism such that redundant measures are automatically and seamlessly enabled upon detection of a FRU fault so that the system is able to continue normal functionality.

A fourth element of system fault tolerance of the present invention is the ability to immediately and expeditiously notify the users if a system FRU failure has occurred.

The FCM controller cards 128 monitor the system for fault conditions described above. If such a condition occurs, then immediate notification is provided by any mechanism known in the art. For example, it is possible to employ FRU LED indication, system alarm trap messages, snmp traps, graphical fault display on the Enterprise Manager control application and call home feature, as well as any other suitable or desired mechanism. By employing expeditious and effective notification, FRU replacement can be made in the least disruptive way and without possible loss of data or undue effort, prior to another FRU failure.

Another element that is important to fault tolerance is the ability to non-disruptively replace or upgrade system FRUs and software modules. If a FRU failure occurs, the FRU must be removed and replaced without interrupting the system function. Once the new board runs internal power on confidence tests and is configured for system operation, the system controller will bring that FRU online and allow it to join the system. Similarly, if a failure or bug is detected in any of the system software modules, that module(s) can be non-disruptively upgraded while the system is in full operation. Non-disruptive code upgrade is also a key element for adding new software features to the system.

Fault tolerance is often predicted and quantified in terms of time elapsed until a failure will occur. The instant system's "Mean Time To Failure" "MTTF" has been computed using standard Bellcore techniques as 250,000, and it is possible that this time could be higher in some instances. This means that based on component reliability specifications and the instantly disclosed system redundancy architecture, it has been statistically determined that a given system would not fail for at least 36 years, even in the event of multiple FRU failures. Having no single point of failure is an important element in the architecture that provides the stated MTTF. The other relevant fact is the system Mean Time To Repair "MTTR". A lower MTTR is a positive notation that a defective component in the system can be quickly and easily replaced. In this case, MTTR is computed to be 0.1 hours. All FRU modules in the instant channel director chassis are preferably designed to be hot swappable. As such, according to one embodiment of the present invention, any FRU in the system can be replaced while the system is online and functioning. This gives rise to a highly repairable system (low MTTR). The result of having a high MTTF and a low MTTR is that the probability of a system failure is infinitesimally small given that the system is architected such that no single point of failure can cause the system to fail (high MTTF), coupled with a short period to repair in the event of a failure (a small MTTR), thereby mitigating the possibility of 2 points of system failure.

The following is a general list of important redundant functions that are preferably employed in the present invention:

Redundant System Control

Redundant Switching Function

Redundant Backplane Path (Back link) Re-direct

Redundant DC Power

Redundant AC Power

Redundant Cooling Mechanism

Redundancy in the instant invention is based on a system control scheme that allows the system to 'heal' itself from a situation where a particular FRU has failed. The core of this document discusses how the various components in the system can detect and seamlessly correct a FRU failure to provide fault tolerance.

The basic FRU Module types 128 are defined below: FCM Modules (advantageously 2 per system) The Controller Module 220 and 221 acts as a system control and monitoring interface. An on board microprocessor referred to as the Common Processor Object (CPO) 222 along with an on board Ethernet connectivity arrangement 223 are the core of the FCM module. The FCM provides a proxy function to various management interfaces including an Enterprise Manager control application 270, if utilized.

FSW Modules (suitably 5 per system) The FSW module 120 is the internal switching engine for a channel director according to the present invention. The FSW module 120 generally includes 4-Protocol Engine (PE) chips 121, a Local Processor (LP) 122 that manages events such as exception conditions, the required gigabit speed serial/de-serial transceiver (serdes) components, etc.

FIO Modules (suitably 1–8 per system) The Input/Output module 200 provides Fibre Channel User ports for the director. It generally includes 4-Protocol Engine (PE) chips 201, a Local Processor (LP) 202 and interface serdes ports 203. It also preferably employs redundancy logic which provides the ability to re-direct internal data interconnect links between FIO and FSW (back links) to the FSW spare card 125.

Figure 5:
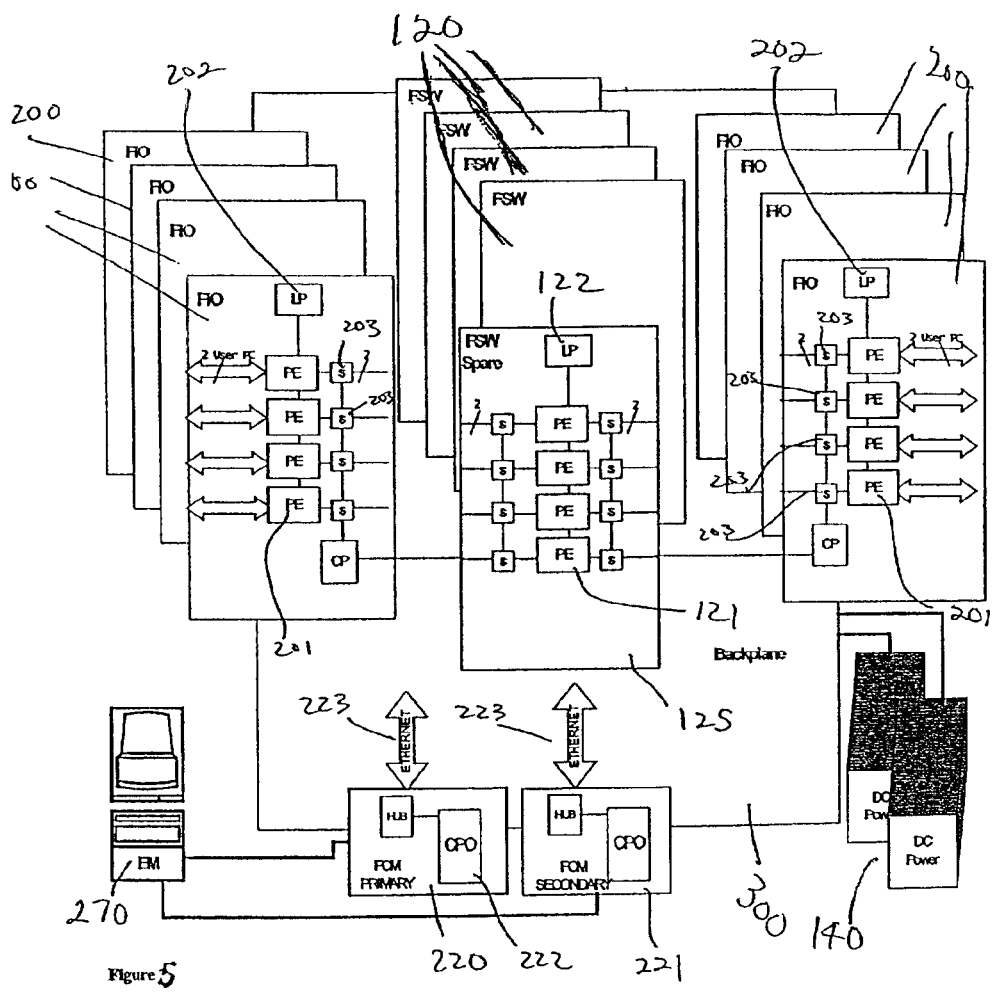
FIG. 5 illustrates a detailed depiction of system redundancy according to the present invention according to one embodiment of the present invention.
Figure 6:
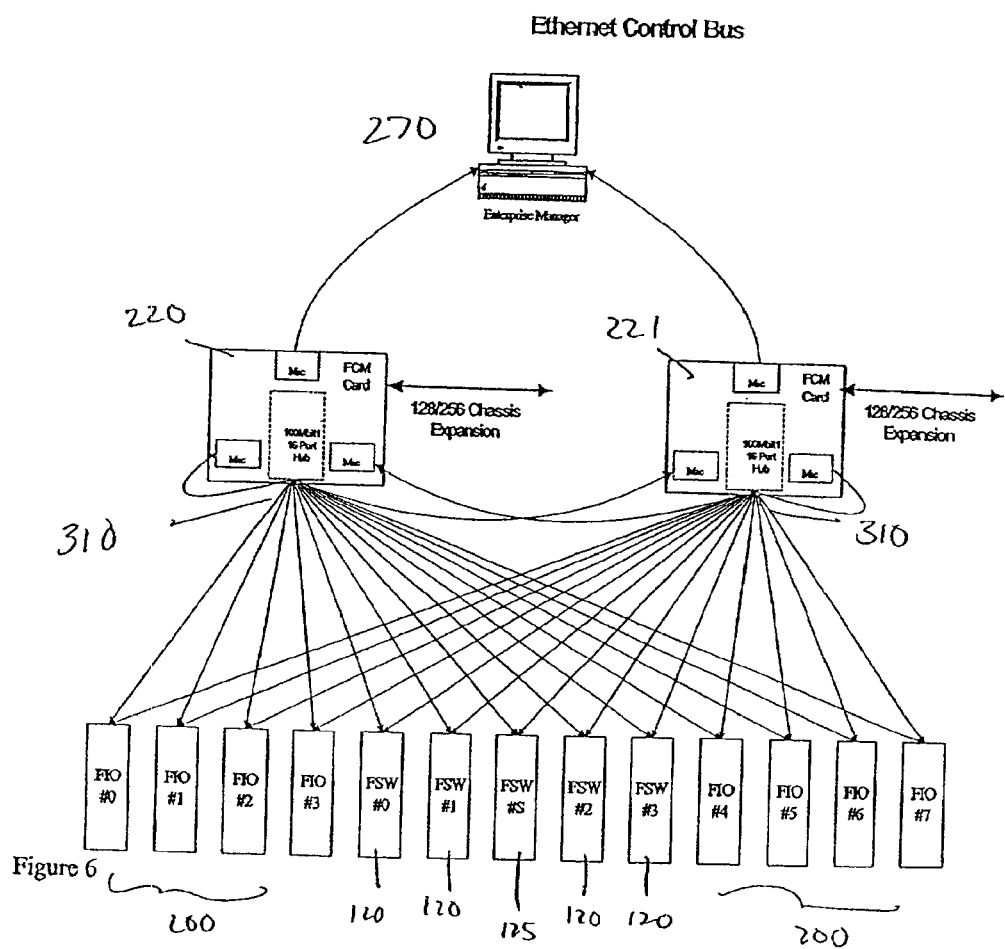
FIG. 6 illustrates a redundant ethernet control bus arrangement according to one aspect of the present invention.
Figure 7:
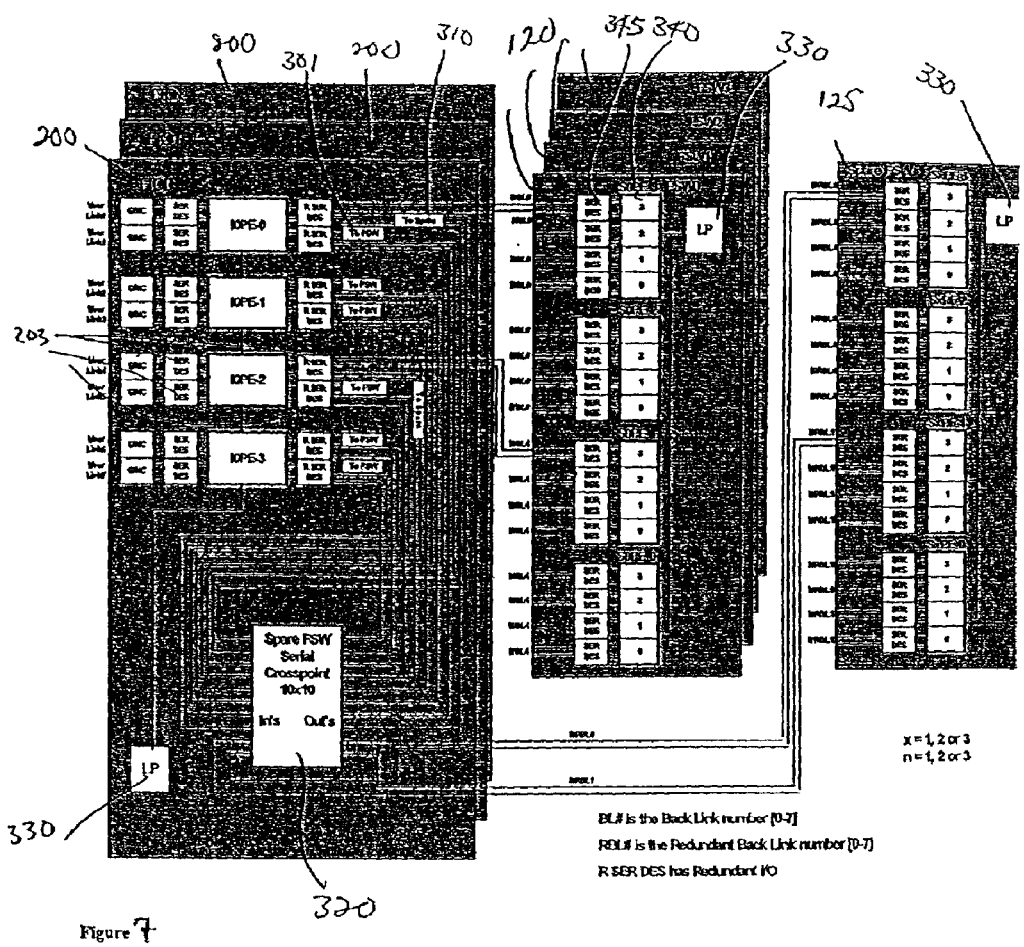
FIG. 7 illustrates FIO and FSW boards showing how a spare FSW board works switching redundancy functions in greater detail according to one embodiment of the present invention.

Fan Modules (advantageously 4 per system) These modules 130 (not shown in FIG. 5, but shown in FIG. 3) are preferably arranged in an N+1 configuration circulate ambient air external to the box across the modules listed above to cool the various components on theses boards.

DC Power Modules (suitably 2 per system) The modules 140 are suitably arranged in a fully redundant configuration provide, for example, 48 volts DC to each of the FRUs listed above through the backplane.

The FCM modules 220, 221 provide a redundant common command and control interface for the system. They are responsible for monitoring the general health of the director, acting as a proxy for all external communications destined for other modules in the system and maintaining a non-volatile system configuration database. They function as the critical monitoring and management function for all system redundancy. The FCM 220, 221 also can be adapted to act as a proxy for all communications from other modules in the system destined for the EM 270 or other management entity such as an SNMP MIB application. The FCM 220,221 preferably contains a software based management agent that executes on a Common Processor Object (CPO), This software communicates with the EM Control System 270 and also communicates with sub-agents on all other LP processor modules in the switch.

The fault tolerant architecture generally has a redundant (Standby) FCM module 221 present at all times. The standby FCM 221 runs the same software executable as the Primary FCM 220. This resident software functions as a 'shadow' that allows the Standby FCM 221 to remain in lock step with the primary FCM 220 so that if a Primary module failure occurs, the Standby can take over system control without system interruption or data loss. The interlock between the Primary and secondary FCM can be achieved, for example, by messages that are passed between the two FRUs that allow them to keep their system database synchronized.

The FCM 220,221 also can be adapted to provide urgent notification of FRU failures to various management agents. These agents then prompt the proper human action required to replace an FRU. Some of these notification mechanisms include call home, snmp traps, alarm graphical alert, (i.e. red box displayed around a failed FRU) and error logging.

The FCM manages online upgrade of system software. It stores an image of the current system software modules that are being executed in non-volatile memory. It also stores a backup copy of each software module in case the current image incurs a fault. The FCM creates a momentary 'invisible' pause in module LP activity to overlay whatever software modules are requested. The FCM has the capability to also load a new CPO software image non-disruptively.

System Ethernet Control Bus

The system internal control bus suitably comprises an ethernet point to point connect arrangement 223 that uses the backplane 300 as the interconnect medium. The redundant point-to-point connectivity shown in FIGS. 3, 4, 5, 6 and 7 provides a fault tolerant architecture for system communication between the chassis controller(s) and the FIO 200 and FSW 120, 125 modules. There are two ethernet control interfaces on each FIO and FSW module for redundancy. The point-to-point connections are attached to an unmanaged 16 port hub-like arrangement 310 on the FCM modules. The internal ethernet buses are preferably managed by a point-to-point high speed control network, such as fibre channel, fire wire or an ethernet controller (i.e. 100 mbit/s or even higher, up to 10 gigabit/sec) and physical layer components. For sake of simplicity, ethernet is referred to herein but one of skill in the art would understand that other platforms could be instead as well. There can also be a third ethernet interface on the FCM modules that provides connectivity to the EM Control System. This interface itself is redundant also by virtue of the redundant FCMs.

The two ethernet segments are a private network internal to the channel director. There is preferably no external visibility of the ethernet on the chassis. Because these are private networks, the Ethernet MAC and IP addresses are preferably pre-configured in the factory. The Addresses can be based, for example, on Board Slot number and Partition ID. All messages on the Internal Ethernet are generally packetized, for example, in UDB format. The EM connection to the FCM cards can be adapted to have a public IP address, however, the internal nodes will only be visible to the EM application.

System Switching Redundancy

System switching redundancy is an important aspect for having a fault tolerant architecture. A detailed block diagram for this redundancy logic is shown, for example, in FIG. 7. This logic provides a means for a seamless switchover from a faulty FSW module to a hot standby 125.

Spare FSW Failover

Each FIO module 10 Back link has a multiplexed redundant IO path 310 through the backplane 300 to the spare FSW cross-connect card 125. A switchover to the spare card 125 will occur if one of the 4 online FSW cards 120 should fail. The multiplexing on the 8 FIO back link connections to the spare FSW 125 is provided by a 10×10 crosspoint chip 320. This logic can be controlled in such a way that all of the traffic routed to a given FSW board 120 can be rerouted to the redundant FSW card 125. This switchover occurs at the system level via a FSW Spare Switchover message which is issued by the Primary FCM Controller to each of the FIO modules in the system. Upon receipt of this command, the Local Processor 330 on the FIO cards will manage the synchronized switchover to the spare card. A manual switchover can be initiated by the user by issuing a FSW Spare Switchover Command from the EM control system.

FSW Failure Detection

FSW errors are detected by the LP 330 on each FSW 120 or FIO FRU module 200. The FCM monitors for conditions where such errors have occurred on one or more switching paths based on error trap messages sent by the various FIO 200 and FSW 120, 125 modules over the system control bus. Once an FSW module has been deemed as failed by the FCM, the switchover process is initiated.

The FCM makes the decision to initiate a dynamic switchover to the FSW Spare 125. This decision can be based, for example, on the following FSW FRU Failure Conditions:

Board Level Errors
  FSW Power on diagnostic error
  FCM has lost communications to both ethernets on an FSW
  FSW resets itself more than once within a given time window
  FSW Overtemp
  FSW Internal Frame Bus error threshold exceeded
  FSW IOP Failure
  Threshold for CRC errors exceeded on n (any 2 out of 16) number of ports on an FSW
  Threshold for Loss Of Sync errors exceeded on n (any 2 out of 16) number of ports on an FSW
FSW PE ASIC Failure The FCM decides when to initiate a dynamic switchover to the FSW Spare 125 based on the determination that all (or more than 1 at least) ports on a given FSW PE 340(or its serdes parts 345) are having trouble. The switchover to the spare can be based, for example, on the following FSW PE individual ASIC failure scenarios:
  Loss Of Sync on all ports of a PE Chip
  CRC error threshold exceeded on a given FSW PE Chip FSW Switchover The following possible sequence of events can be programmed to occur when a switchover to the spare FSW is conducted:
  The FIO switching paths 301 to the suspect FSW card are throttled back
  The Spare FSW 125 is setup with the configuration and personality of the failed FSW 120.
  The FIO back links (2 per FIO) that are affected by the failure are switched to the spare FSW 125.
  The FIO paths are re-enabled.

FIO-FSW Back link Path Re-direct

Individual back link paths between the FIO and FSWs may be re-directed upon detection of a fault condition on a given back link path. There can be, for example, 8 switching paths 301 available from each FIO into the FSW switch core that is comprised of 4 FSW modules plus the Spare. Two of these interconnects exist from each FIO to each FSW. A failure condition can be detected by any FIO or FSW Local Processor based on encoding and CRC physical interconnect errors. If such an error condition exists, the system FCM module will receive notification trap messages to this regard. The detection and re-direct mechanisms are similar to those used for FSW Switchover on a more localized basis. The difference here is that a complete FSW module failure condition has not been detected. Instead, an LP has deemed a single path faulty. The LP can then make the local adjustment to re-route traffic from a faulty back link to one of the other 7 back links in order to preserve system integrity. If the situation eventually escalates into a full FSW failure scenario, then the FCM shall conduct an FSW switchover.

Redundant Power Subsystem

Figure 8:
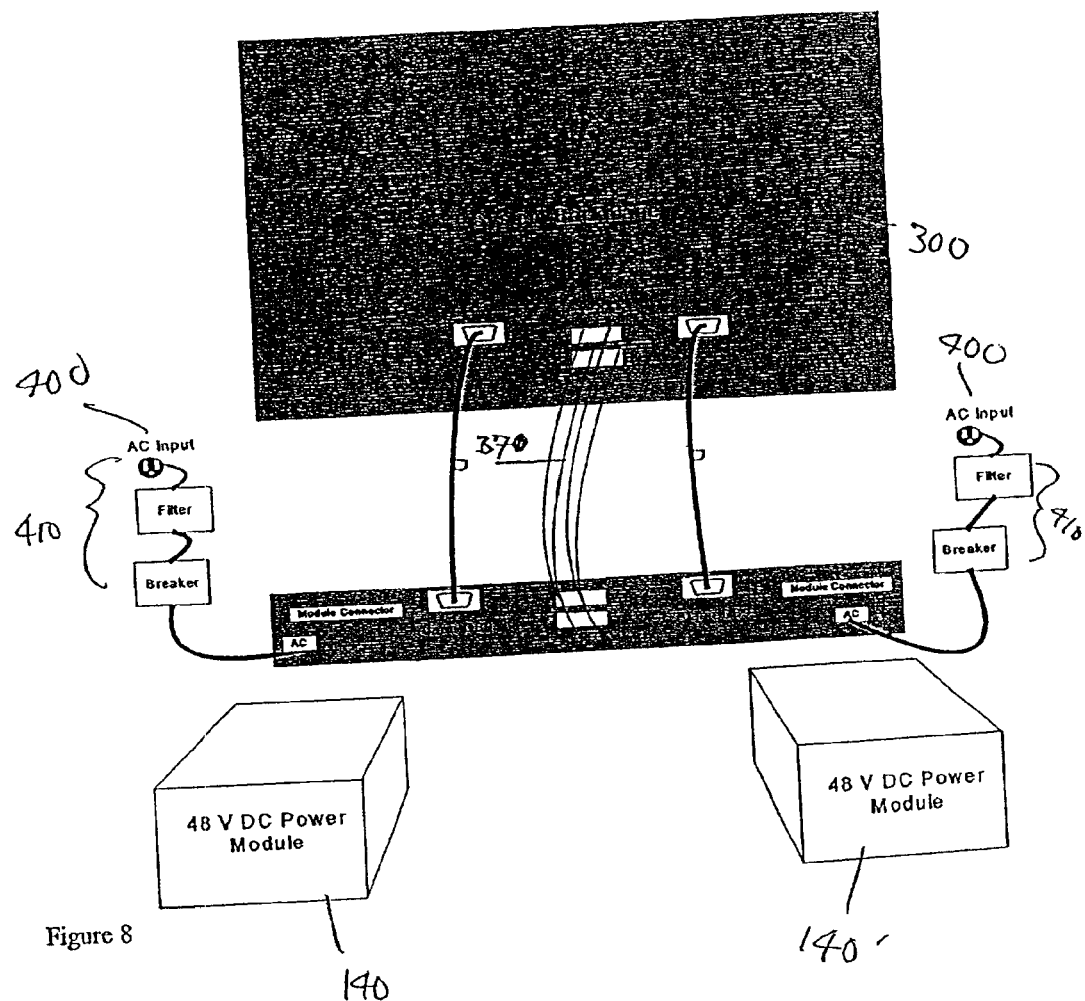
FIG. 8 illustrates a suitable arrangement for redundant power supply to a system according to the present invention.

A possible power subsystem can be designed so that data transmission is not interrupted due to a single point of failure in the power subsystem as best shown in FIG. 8. The redundant ac inputs 400 can comprise 220 volts nominal, with a continuous operating range of from 180 to 264 VAC. A suitable input frequency is 50/60 Hz nominal with a continuous operating range of 47 to 63 Hz. The output can be nominally 48 VDC with no user accessible adjustment required. The power requirement for this system can be 1800 Watts, as an example. The power subsystem 140 has full redundancy in the form of two 1800-watt DC 'bricks'. Each brick 140 has an independent AC power input 410 (line, breaker and filter) and independent 48-volt DC wave crimp cable 370 connections to the backplane 300. While both supply bricks are functioning normally, they each will preferably provide ½ the necessary system DC current (approximately 38 AMPs) effectively sharing the system load. If one of the bricks should fail, the other will instantaneously take over the remainder of the system load. There is sufficient energy stored within the power subsystem at the time of a failure to eliminate any 'droop' in the system voltage during the failure.

Each power supply can optionally be adapted to provide an isolated TTL compatible (referenced to an input logic ground) "1" when a service input fault is detected. This "AC Fail" signal is preferably generated a minimum of 2 milliseconds before the output dc voltage escapes the regulation band. Normally, the signal will be "0" ("AC GOOD"). Also, each power supply provides an isolated TTL compatible (referenced to an input logic ground) "1" when a dc output fault is detected. This "DC BAD" signal will be generated when the output dc voltage escapes the regulation band. Normally, the signal will be "0" ("DC GOOD"). A "Supply Present" signal can also provided. The status signals mentioned are be monitored by the to the FCM modules. The power subsystem exists in an integrated sub-chassis. The supplies themselves can optionally be hot swappable via blind mate connectors.

System Cooling

Figure 9:
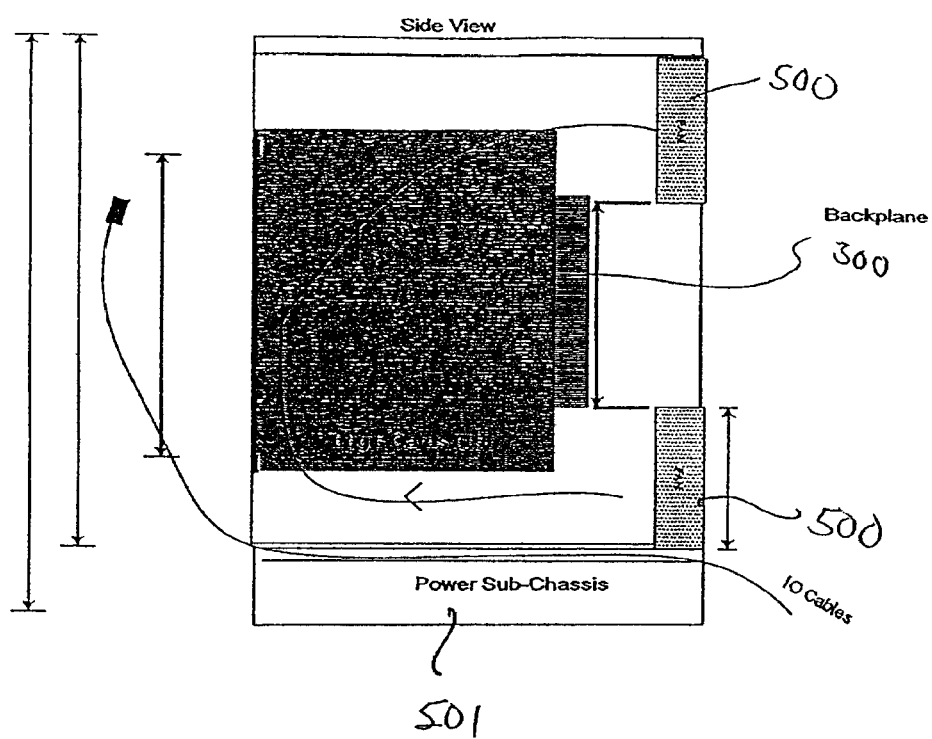
FIG. 9 illustrates a suitable arrangement for air circulation according to one aspect of the present invention.

The instant apparatus and method can employ cooling, for example, via 4-fans in the rear of each 64 port chassis in an N+1 configuration. See FIG. 9. The two lower fans 500 push air into the chassis while the upper fans 500 (which are preferably identical to the lower fans) draw air through the card chassis. Each of these fans is powered off of 48 volts DC and can provide up to 300 cfm. In fact, all 4 fans are preferably identical and swappable with each other. A universal fan assembly can be designed such that it can replace any of the 4 fans with the same assembly. A tachometer output exists from each fan so that the FCM chassis controllers (both) can monitor the health of each fan module. The Primary FCM module will drive a programmable PWM pin going to the fans in order to control their speed. In the event of a single fan failure, the three remaining fans may be sped up to a different operating rpm. Proper plenum area is provided behind the backplane 300 in order to move air uniformly through the chassis 501. The design will work with a single fan failure. The ability to work with more than one fan failed is desirable.

The cooling design is preferably capable of functioning with two chassis stacked vertically to function as a 128-port director. The chassis 501 have independent cooling fans. The 'system' Primary FCM controller assembly is responsible for polling each local chassis for fan status. Similar expansion will be available for the 256 port FC9000 with 2–128 arrangements connected side by side.

All documents referred to herein are specifically incorporated by reference in their entireties.

As used herein, articles such as "a", "the", "an" and so on, can connote the singular or the plural of the object that follows.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fault tolerant switch comprising:
   a) a plurality of i/o cards, each having at least one port and an i/o local processor that detects errors and sends error messages;
   b) at least one primary switch board and one redundant switch board for providing switched connections between the ports, each having a switch board local processor that detects errors on the switch board and sends error messages;
   c) at least one control module having a microprocessor that receives the error messages, wherein upon the receipt of an error message indicating a failure in one of the primary switch boards, the control module instructs every i/o card to discontinue use of the defective primary switch board in favor of the redundant switch board.

2. The switch of claim 1, wherein each i/o card is linked to the redundant switch board through a multiplexed redundant path using a crosspoint chip.

3. The switch of claim 2, wherein the instruction to discontinue use of the defective switch board is received by the i/o local processor in each i/o card, which redirects data to the redundant switch board by managing the crosspoint chip.

4. The switch of claim 3, wherein data paths to the defective primary switch board are throttled back and the redundant switch board is set up with a configuration matching the defective primary switch board before the data is redirected to the redundant switch board.

5. The switch of claim 1, wherein the errors detected by the local processors are data communication error.

6. The switch of claim 4, wherein the data communication errors are CRC errors on actual data.

7. A fault tolerant switch comprising:
   a) a plurality of i/o cards, each having at least one port and an i/o local processor;
   b) a plurality of switch boards having a switch board local processor, the switch boards providing switched connections between the ports;
   c) a data pathway between the i/o cards and the switch boards for transmitting data between the ports and the switch boards;
   d) at least one control module for monitoring the switch; and
   e) a control pathway connecting each i/o card and each switch board to every control module;
   wherein the i/o local processor and the switch board local processors send error messages to the control module over the control pathway without interfering with the data pathway.

8. The switch of claim 7, wherein the control module has a hub arrangement for the purpose of establishing the control pathway.

9. The switch of claim 8, wherein the control pathway uses a protocol chosen from the set including Ethernet protocol, Fibre Channel protocol and the IEEE 1394 FireWire protocol.

10. The switch of claim 7, wherein the control pathway is a private network.

11. The switch of claim 7, wherein each i/o card and each switch board has two interfaces to the control pathway.

12. A fault tolerant switch comprising:
   a) an i/o card having at least one port;
   b) a switch board for providing switched connections between the ports;
   c) two data pathways between the i/o card and the switch board for transmitting data;
   d) a local processor that detects errors based on communications between the i/o card and the switch board wherein upon the detection of an error indicating a failure in one of the data pathways causes the i/o card to discontinue the failed pathway and to use only the non-failed pathway.

13. The switch of claim 12, further comprising a plurality of additional switch cards, wherein the i/o card is connected to each switch card through two data pathways and wherein the failure of a single data pathway causes the i/o card to cease transmission on the failed pathway in favor of transmitting data on any of the other data pathways.

14. The switch of claim 12, further comprising
   e) a control module that receives error messages sent by the local processor upon the detection of an error, whereupon the control module determines when a data pathway has failed and instructs the i/o card to discontinue use of the failed pathway.

15. The switch of claim 14, wherein the local processor is on one of the i/o card and the switch board.

16. The switch of claim 14, wherein the local processor is on the i/o card, and a second local processor for detecting errors and sending error messages based on communications between the i/o card and the switch board is located on the switch board.

17. The switch of claim 12, wherein the local processor is on the i/o card, and a second local processor for detecting errors indicating a failure in one of the data pathways is located on the switch board.

18. A fault tolerant switch comprising:
   a) a plurality of i/o cards, each having at least one port;
   b) at least one primary switch board and one redundant switch board for providing switched connections between the ports;
   c) a local processor that detects errors found in an actual data transmission over one of the primary switch board without requiring the sending of test data over the primary switch boards;
   d) a control module that, upon the receipt of an error message from the local processor indicating a failure in one of the primary switch boards, the control module instructs every i/o card to discontinue use of the failed switch board in favor of the redundant switch board.

19. The switch of claim 18, wherein the local processor detects a CRC error.

20. A fault tolerant switch comprising:
   a) a plurality of i/o cards, each having at least one port;
   b) at least one primary switch board and one redundant switch board for providing switched connections between the ports,
   c) at least two data pathways between each i/o card and each switch board for transmitting data between the ports and the switch boards;
   d) a plurality of local processors that detect errors found in an actual data transmission over one of the primary switch boards without requiring the sending of test data over the primary switch boards, the local processors being found on at least one of the i/o cards and the switch boards;
   e) at least one control module that monitors the switch; and
   f) a control pathway connecting each i/o card and each switch board to the control module, the control pathway sending error messages from the local processors to the control module indicating a failure in one of the primary switch boards, whereupon the control module responds by sending a command over the control pathway to every i/o card to discontinue use of the failed switch board in favor of the redundant switchboard.

21. A method for responding to an error within a data switch comprising:
   a) monitoring data being transmitted from an i/o card through a data pathway and across a primary switch board to detect errors originating at the primary switch board;
   b) sending an error message to a control board over a control pathway separate from the data pathway;
   c) responding to the error message by sending a command over the control pathway to the i/o card instructing the i/o card to discontinue use of the primary switch board;
   d) responding to the command at the i/o card by redirecting the data from the primary switch board to a redundant switch board.

22. A method for responding to an error within a data switch comprising:
   a) monitoring actual data being transmitted from a first i/o card across a primary switch board to detect errors originating at the primary switch board without sending test data across the primary switch board;
   b) upon the detection of an error, sending a command to multiple i/o cards to discontinue use of the primary switch board;
   c) responding to the command at the i/o cards by redirecting the actual data from the primary switch board to a redundant switch board.

23. A method for responding to an error within a data switch comprising:
   a) monitoring actual data being transmitted from an i/o card through a data pathway and across a primary switch board to detect errors originating at the primary switch board without sending test data across the primary switch board;
   b) sending an error message to a control board over a control pathway separate from the data pathway;
   c) responding to the error message by sending a command over the control pathway to the i/o card to discontinue use of the primary switchboard;
   d) responding to the command at the i/o card by redirecting the actual data from the primary switch board to a redundant switch board.

24. The method of claim 23, wherein all data sent across the primary switch board is monitored for errors that can trigger an error message.

25. A method for upgrading software in a switch having local processors in module cards found within the switch, the method comprising:
   a) storing an image of current system software modules that are being executed in non-volatile memory;
   b) storing a backup copy of each software module in case of fault in the current image;
   c) creating a momentary pause in local processor activity; and
   d) overlaying new software modules over the existing modules.

* * * * *